(12) United States Patent
Vollimer

(10) Patent No.: US 6,447,011 B1
(45) Date of Patent: Sep. 10, 2002

(54) SAFETY BELT ARRANGEMENT FOR MOTOR VEHICLES

(75) Inventor: Elmar Vollimer, Feldwies (DE)

(73) Assignee: Audi AG (DE)

( * ) Notice: Subject to any disclaimer, the term of this patent is extended or adjusted under 35 U.S.C. 154(b) by 0 days.

(21) Appl. No.: 09/647,985
(22) PCT Filed: Apr. 8, 1999
(86) PCT No.: PCT/EP99/02363
§ 371 (c)(1),
(2), (4) Date: Nov. 20, 2000
(87) PCT Pub. No.: WO99/52747
PCT Pub. Date: Oct. 21, 1999

(30) Foreign Application Priority Data

Apr. 4, 1998 (DE) .......................................... 198 16 277

(51) Int. Cl.⁷ ............................................... B60R 22/46
(52) U.S. Cl. ....................................... 280/806; 280/808
(58) Field of Search .............................. 280/805, 806, 280/807, 803, 801.1, 808

(56) References Cited

U.S. PATENT DOCUMENTS

| | | | |
|---|---|---|---|
| 3,982,775 A | | 9/1976 | Lindblad |
| 4,569,536 A | * | 2/1986 | Tsuge et al. ................. 280/807 |
| 4,666,097 A | * | 5/1987 | Tsuge et al. ............. 280/807 X |
| 4,884,652 A | * | 12/1989 | Vollmer ................... 280/806 X |
| 4,966,394 A | * | 10/1990 | Thomas et al. ............. 280/807 |
| 5,244,231 A | * | 9/1993 | Bauer et al. ................. 280/807 |
| 5,394,955 A | * | 3/1995 | Howard ....................... 280/807 |
| 5,407,148 A | | 4/1995 | Katsuyasu et al. |
| 5,415,431 A | * | 5/1995 | Omura ................... 280/806 X |
| 5,492,368 A | | 2/1996 | Pywell |
| 5,704,638 A | * | 1/1998 | Lane, Jr. ...................... 280/806 |
| 5,873,599 A | * | 2/1999 | Bauere et al. .............. 280/806 |
| 6,017,060 A | * | 1/2000 | Wilson et al. .......... 280/806 X |
| 6,179,330 B1 | * | 1/2001 | Wier .......................... 280/806 |
| 6,202,488 B1 | * | 3/2001 | Cash .......................... 280/806 |

FOREIGN PATENT DOCUMENTS

| | | | |
|---|---|---|---|
| DE | 3343325 | 6/1985 | |
| DE | 3620544 | * 12/1987 | ................. 280/806 |
| DE | 3932622 | * 5/1990 | ................. 280/806 |
| DE | 1952268 | 6/1996 | |
| DE | 2970212 | 7/1997 | |
| GB | WO8901430 | * 2/1989 | ................. 280/806 |

* cited by examiner

Primary Examiner—Paul N. Dickson
Assistant Examiner—Toan To
(74) Attorney, Agent, or Firm—Stevens, Davis, Miller & Mosher, LLP

(57) ABSTRACT

A safety belt assembly for a motor vehicle includes a seat belt tightener for tightening the seat belt upon the deformation of the vehicle chassis. Sensors are located within the chassis that determine when the anchor points of the seat belts move relative to each other, which indicates the chassis is collapsing. When these anchor point move, the seat belt slackens. The seat belt tightener then brings up the slack to prevent the passenger from being thrust from the seat. The assembly also includes a force limiter which prevents the over tightening of the seat belt.

10 Claims, 2 Drawing Sheets

SAFETY BELT ARRANGEMENT FOR MOTOR VEHICLES

The invention relates to a safety belt assembly for motor vehicles as described in the claims in view of the specification.

BACKGROUND OF THE INVENTION

Safety belts for motor vehicles have long been known. They serve the purpose of restraining passengers of a vehicle in the passenger seats in the event of an accident and so of protecting the passengers from uncontrollable movements in the interior of the vehicle. This greatly reduces the risk of injury to passengers in the vehicle.

Abrupt vehicle deceleration is known to occur in the event of frontal impact. Since motor vehicle passengers with belts fastened are not rigidly connected to the vehicle or the vehicle seat, there is a certain time delay between vehicle deceleration and passenger deceleration. The greater this time delay, the greater is the stress to which the passenger is subjected. This time delay is determined essentially by slack belt lengths.

Various safety belt assemblies are known which have electronically actuatable belt tightening devices for prevention of slack belt lengths. In these assemblies the severity of an accident is detected by means of sensors and is evaluated in a control unit. The belt-tightening device is appropriately activated by the control unit immediately after the beginning of an accident when a specific accident severity value is reached. As a result, the vehicle passenger is immobilized in his seat a few milliseconds after the accident begins. The danger of slipping beneath the pelvic section of the safety belt and striking the head, against the steering wheel for example is also reduced. The faster and more securely the passenger are immobilized in the vehicle seat; the lower is the risk of injury to the passenger. These remarks apply equally to an accident involving side impact.

A safety belt normally is fastened to three anchor points on the vehicle body. Generally the position of these anchor points remains unchanged during the entire course of an accident in a frontal or rear impact, unless the vehicle body is damaged in the area of the B columns.

The danger that the B column of the vehicle body will be damaged during an accident exists chiefly in the event of a side impact by another vehicle or of a rollover. In these cases the B column often buckles and as a result is displaced relative to the rest of the vehicle. Such displacement is accompanied by change in the relative position of the anchor points of the safety belt, this resulting in recurrence of slack belt lengths. Since the belt-tightening device operates only for a relatively brief period and actuation takes place for the most part immediately at the beginning of an accident, slack belt lengths may recur as the accident proceeds. The vehicle passenger is then no longer immobilized in his seat because of such repeated belt loosening, this leading to the consequence already described that the risk of injury is greatly increased.

DE 195 22 684 A I discloses a device for prevention of belt loosening in which device the shoulder belt section of the safety belt is controlled by a guide integrated into the vehicle seat. This guide comprises a clamping mechanism which may be actuated in the event of an accident and when actuated immobilizes the shoulder belt on the vehicle seat. Displacements of the anchor point of the shoulder belt relative to the vehicle seat occurring, as an accident progresses no longer cause belt length loosening with this device. Consequently, the vehicle passenger remains immobilized in his seat. However, this device requires costly modifications of the vehicle seat, which present a disadvantage from the optical viewpoint as well. Vertical adjustment of the shoulder belt is also no longer possible, since the position of the guide in the vehicle seat is assigned in advance as an invariable.

Reference DE 42 17 969 C2 discloses a belt tightening device with a multistage ignition drive. This belt tightening device permits delayed actuation of a plurality of explosive charges in succession. The time delay, however, performs the function exclusively of restricting belt restraint force. The second actuation cannot be effected independently of the first; it always occurs immediately and necessarily after the first actuation.

SUMMARY OF THE INVENTION

The object of the invention is to create a safety belt assembly for motor vehicles which does not present the disadvantages indicated above, which prevent loosening of belt lengths in particular as an accident progresses, an assembly which is simple to produce by cost-effective means.

The essential idea of the invention is represented by design of a safety belt assembly such that the safety belt may be tightened twice in succession by actuation of a belt-tightening device. The second actuation of the belt-tightening device prevents loosening of lengths of the belt, which may occur as an accident progresses.

Relative displacement of the anchor points of the safety belt is detected by at least one sensor mounted on the B column of the vehicle body.

In order to limit for the sake of safety the strain on a passenger in a vehicle by a second actuation of the belt-tightening device, a belt force limiter is provided on the safety belt; it sets a maximum value for belt force.

Inasmuch as belt tightening devices which may be actuated only once are highly complicated in structure, and this applies to a far greater extent to belt tightening devices which may be actuated twice, in a simpler embodiment of a safety belt assembly provision is made for replacement of the belt-tightening device, which may be actuated twice with two separate belt-tightening devices of conventional design.

BRIEF DESCRIPTION OF THE DRAWINGS

The invention is discussed in detail with reference to the drawings, in which.

DETAILED DESCRIPTION OF THE PREFERRED EMBODIMENT

Figure 1:
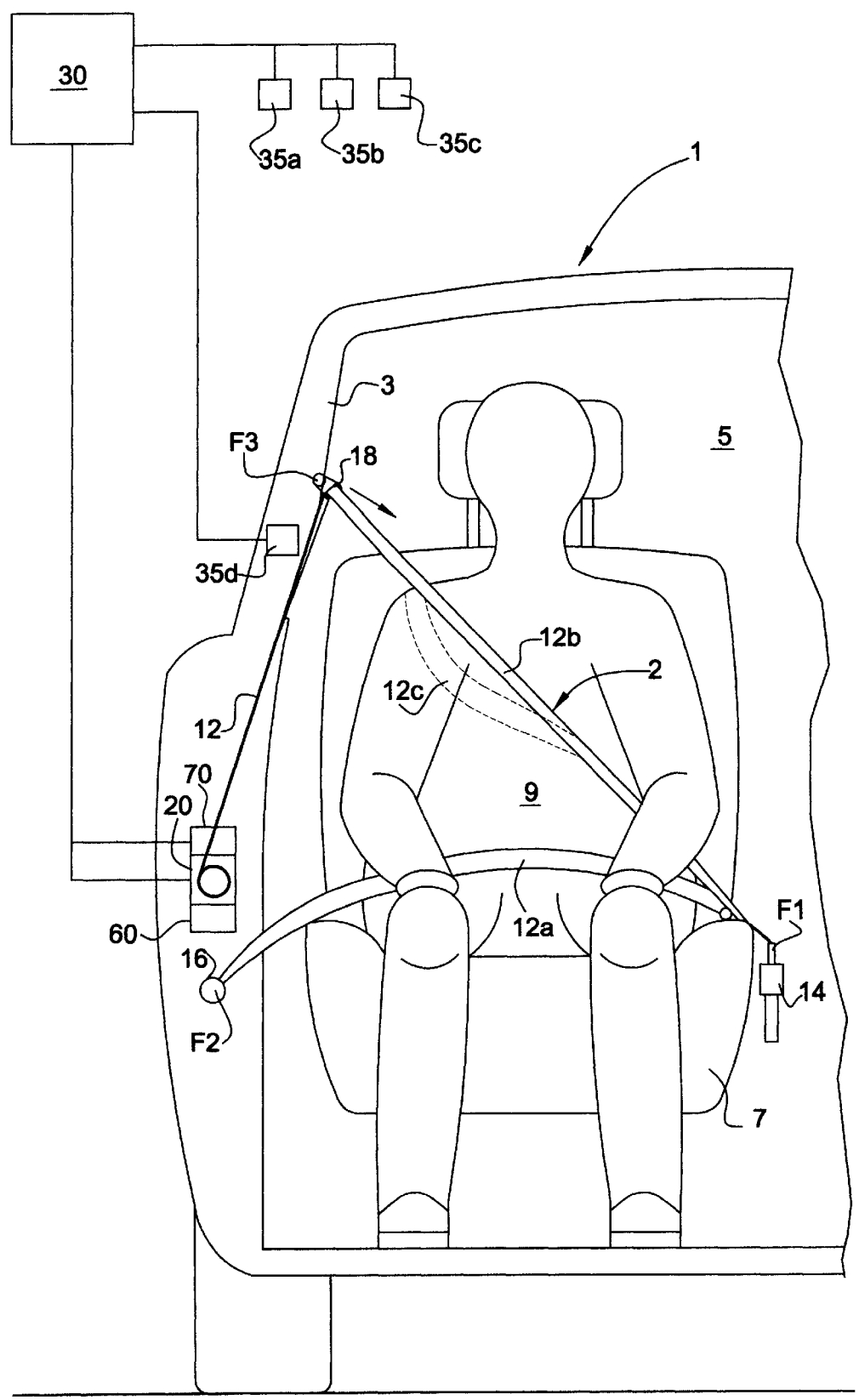
FIG. 1 presents a diagram of a safety belt assembly claimed for the invention corresponding to a first embodiment in the interior of a vehicle, and FIG. 2 a diagram of a safety belt assembly corresponding to a second embodiment in the interior of a vehicle.

FIG. 1 presents a diagram of the vehicle interior 5 with a safety belt assembly 2 claimed for the invention in the area of a vehicle seat 7 in a motor vehicle 1. The safety belt assembly 2 comprises a conventional safety belt 12 with a belt tightening device 20 which may be actuated by a control unit 30 to which a plurality of sensors 35a, b, c and d are connected. The sensors 35a, b, c and d receive accident-relevant data. The sensor 35d mounted in the area of a B column 3 of the body of the motor vehicle 1 detects any deformations of the B column 3 in the course of an accident.

A vehicle passenger 9 is restrained in the vehicle seat 7 by means of the safety belt 12. The safety belt 12 is anchored to the vehicle at three points F1, F2, and F3. A belt fastener 14 (anchor point F1) divides the safety belt 12 into two sections, a lap belt 12a and a shoulder belt 12b. The shoulder belt 12b extends from the belt fastener 14 over the chest area of the vehicle passenger 9 to B column 3, where its direction is changed by a guide fastening 18 (anchor point F3). The shoulder belt 12b extends concealed inside the B column 3 on to the belt-tightening device 20. The lap belt 12a leads from the belt fastener 14 over the pelvic area of the vehicle passenger 9 to a mounting support 16 (anchor point F2) in or on the B column 3. An example of a slack length of belt 12c is indicated by broken lines.

Figure 2:
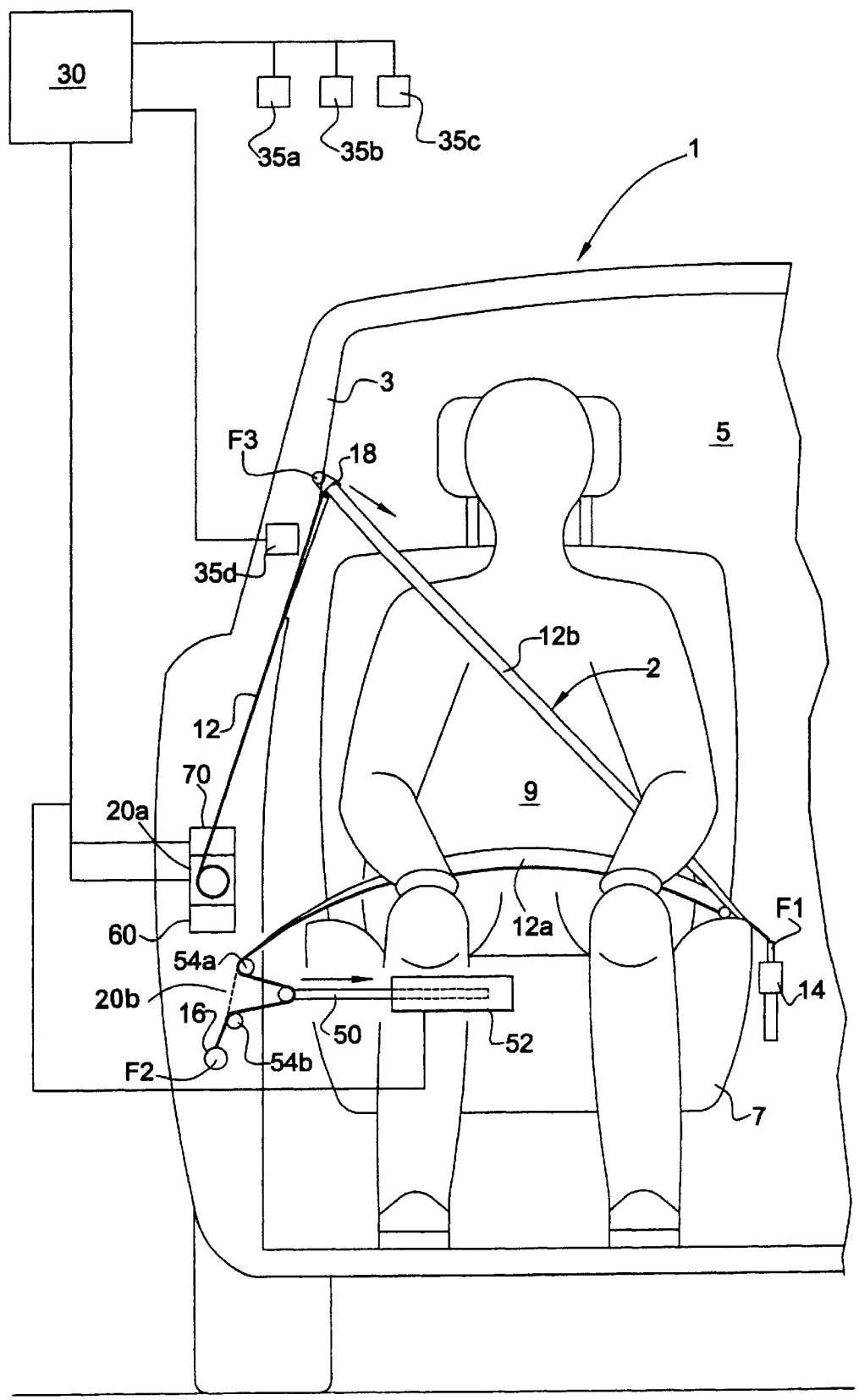

FIG. 2 illustrates a second embodiment of a belt-tightening device as claimed for the invention. The numbering corresponds more or less to that selected for FIG. 1. Unlike the first embodiment, however, the belt-tightening device 20 is provided with a conventional belt tightening device 20a and an additional belt tightening device 20b on the lap belt 12a. The belt tightening device 20b may consist, for example, of a connecting rod 50 which may be displaced in the direction of the arrow by means of an actuating device 52.

When the belt tightening device 20b is actuated the lap belt 12a is guided between guide rollers 54a, 54b and the entire safety belt 12 is tightened or loosening of belt lengths is eliminated.

The actuating mechanism 52 is integrated into the vehicle seat 7 so as not to be visible externally. Providing guide rollers 54a, 54b on or inside the vehicle seat 7 rather than inside the B column 3 in order to make the entire belt tightening device 20b as inconspicuous as possible is also conceivable.

The second belt tightening device 20b may also be installed at another point on the safety belt 12. For example, a belt-tightening device permitting displacement of the belt fastener 12 toward the bottom of the vehicle is conceivable. Another alternative is a conventional belt-tightening device at the end of the lap belt 12a or another belt tightening device acting on the belt section extending into the B column 3 of the safety belt 12.

The operation of the invention is described in detail below.

The safety belt 12 is normally in position under slight tension on a vehicle passenger 9. This tension is generated by a pretension belt winder in the belt tightening device 20 or 20a. The vehicle passenger 9 can move with relative freedom. His freedom of movement is restricted only slightly by this light belt tension.

The sensors 35a, b, c and d react in the event of an accident. The signals of these sensors 35a, b, c and d are transmitted to the control unit 30 and are evaluated in this unit. Should these sensor signals exceed specific threshold values, the belt tightening device 20 or 20a is activated by the control unit 30. Belt tightening devices are generally actuated by pyroelectric means. The shoulder belt 12b and the lap belt 12a are tightened by initial actuation of the belt tightening device 20 or 20a. Any slack belt lengths 12 possibly present are eliminated. The vehicle passenger 9 is rigidly immobilized in the vehicle seat 7 a few milliseconds after the beginning of an accident.

In the event of a side impact or in a rollover the possibility now exists that the B column 3 will not be damaged immediately at the beginning of an accident but later, after the initial action of the belt-tightening device 20 or 20a has "fizzled out." Damage such as this frequently results in more or less extensive buckling of the B column 3. The anchor point F3 is then displaced relative to the other anchor points F2 and F1 in the direction of the arrow and the longitudinal distance from F3 to F1 decreases. This has the undesirable consequence that shoulder belt 12b; tight previously at the beginning of the accident again has a slack belt length 12c. It is claimed for the invention that this slack belt length 12c is eliminated either by repeated actuation of the belt tightening device 20 or, in the second embodiment, by actuation of the belt tightening device 20b. After actuation of the belt tightening device 20 or 20b the safety belt 12 is sufficiently tightened and the vehicle passenger consequently again immobilized in his seat. The risk of injury to the vehicle passenger 9 as the accident continues to develop is reduced as a result.

Since relative displacement of the anchor points F1, F2, and F3 can in theory take place only as a result of damage in the area of the B column 3, it is claimed for the invention that at least one sensor 35d is installed in the B column 3, deformation of which is detected directly or indirectly by this sensor. In addition to displacement of anchor point F3, displacement of anchor point F2 in the event of side impact is of course also conceivable. An additional sensor would have to be provided for detection of such displacement.

In order to prevent strain on the vehicle passenger 9, repeated actuation of the belt-tightening device 20 should occur in reality only if a slack belt length 12c is present. Since a slack belt length 12c cannot be measured directly but can be computed from the data of the sensors 35a, b, c and d, it is logical to provide a belt-force limiting device 60 which restricts the force of the safety belt 12 to a maximum value. Such devices are known in the art and can either be a separate unit from the belt-tensioning devices or incorporated therein. The vehicle passenger 9 is thereby protected from subjection to excessive strain, in particular if a second actuation occurs without noticeable loosening of a belt length 12c having occurred.

If there is a slack belt length 12c, the tension of the safety belt 12 generally decreases. Decreases in tension such as this occurring during an accident can be detected by a tension sensor 70 which operates in conjunction with the safety belt 12 and processed in the control unit 30. Repeated actuation of the belt-tightening device 20 also occurs if the value of the tension signal falls below a specific boundary value during an accident.

Sensor 35d may be dispensed with in this design, since an effect (slack belt length) can be detected independently of the causes.

The invention is not restricted to a driver or passenger seat. An assembly with suitable sensors on other vehicle seats is also conceivable.

The mode of operation is similar when two separate belt tightening devices 20a, b are used. Repeated actuation of the belt-tightening device 20b after initial actuation of the belt tightening device 20a is replaced by actuation of the belt tightening device 20b by the control unit 30.

The proposed safety belt assembly 2 makes it possible to eliminate slack belt lengths 12c, which may occur while an accident is in progress. This results in reduction of the risk of injury to the occupant 9 of a vehicle as the accident progresses.

What is claimed is:

1. A safety belt assembly for a motor vehicle comprising:
   a belt fastened to at least one anchor point on the body of said vehicle;
   a belt tightening device operatively connected to said belt;
   means for sensing a displacement of the position of said anchor point relative to another fixed point of said vehicle; and
   a control unit responsive to said sensing means for actuating said belt tightening device.

2. An assembly according to claim 1 including second means for sensing a deceleration of said vehicle greater than a predetermined amount, and wherein said control unit is responsive to said second sensing means for actuating said belt tightening device.

3. An assembly according to claim 1 including means for precluding a tensioning of said belt beyond a predetermined amount.

4. A safety belt assembly according to claim 1 wherein said displacement detectable by said sensing means is a displacement caused by a deformation of said vehicle.

5. The safety belt assembly as described in claim 1, wherein the control unit is connected to a deformation sensor, which is mounted on the B column of a motor vehicle body.

6. The safety belt assembly as described in claim 1, wherein a belt force limiter is provided on the safety belt.

7. The safety belt assembly as described in claim 1, wherein a tension force is provided, which is interactively connected to the safety belt.

8. The safety belt assembly as described in claim 2, wherein the control unit is connected to a deformation sensor, which is mounted on the B column of a motor vehicle body.

9. The safety belt assembly as described in claim 2, wherein a belt force limiter is provided on the safety belt.

10. The safety belt assembly as described in claim 2, wherein a tension force sensor is provided, which is interactively connected to the safety belt.

* * * * *

UNITED STATES PATENT AND TRADEMARK OFFICE
CERTIFICATE OF CORRECTION

PATENT NO.     : 6,447,011 B1                                              Page 1 of 1
DATED          : September 10, 2002
INVENTOR(S)    : Elmar Vollmer It is certified that error appears in the above-identified patent and that said Letters Patent is hereby corrected as shown below:

<u>Title page,</u>
Item [75], please delete "Elmar Vollimer" and insert -- Elmar Vollmer --
Item [30], please delete "Apr. 4, 1998" and insert -- Apr. 11, 1998 --

Signed and Sealed this

Thirty-first Day of December, 2002

JAMES E. ROGAN
*Director of the United States Patent and Trademark Office*